Figure 1:
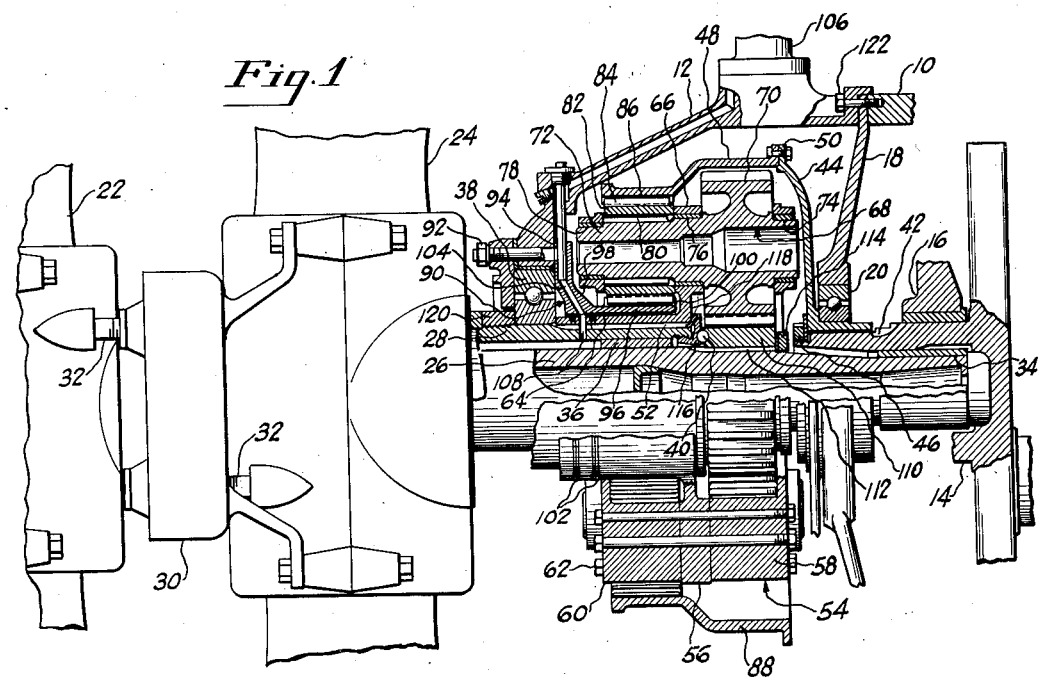

April 18, 1939. E. A. RYDER 2,154,532

PROPELLER DRIVE FOR OPPOSITELY ROTATING COAXIAL PROPELLERS

Filed May 14, 1936

INVENTOR.
Earle A. Ryder
BY Harris G. Luther
ATTORNEY

Patented Apr. 18, 1939

2,154,532

UNITED STATES PATENT OFFICE 2,154,532

PROPELLER DRIVE FOR OPPOSITELY ROTATING COAXIAL PROPELLERS

Earle A. Ryder, West Hartford, Conn., assignor to United Aircraft Corporation, East Hartford, Conn., a corporation of Delaware Application May 14, 1936, Serial No. 79,644

5 Claims. (Cl. 74—305)

This invention relates to a propeller drive for double rotating coaxial propellers and has particular reference to a mechanism for driving a pair of coaxial aeronautical propellers in opposite directions from a single power plant such as an internal combustion engine of the type ordinarily employed for the propulsion of airplanes.

One of the objects of the invention is to provide a mechanism of the character described which is small and compact so that it will readily fit into the nose portion of an ordinary engine and which at the same time is sufficiently light so that it will not add materially to the dead load of the airplane.

A further object resides in the provision of a device of the character described which has a large factor of safety so that it will at all times transmit the necessary power loads without danger of failure or undue wear. One factor in this object resides in the provision of a gear drive in which the gears are so arranged that the gear tooth loads are kept at the minimum value consistent with the size of the gear unit and the power to be transmitted.

Other objects and advantages will be more particularly pointed out hereinafter or will become apparent as the description proceeds.

In the accompanying drawing there is illustrated a suitable mechanical embodiment of what is now considered to be the preferred form of the idea of the invention; the drawing, however, is for the purpose of illustration only and is not to be taken as limiting the invention, the scope of which is to be measured entirely by the scope of the appended claims.

In the drawing, Fig. 1 is a vertical sectional view of a drive gear constructed according to the idea of the invention, certain fragmentary parts of the engine being also shown in section and fragmentary parts of suitable propellers being shown in elevation to illustrate the application of the improved gear design to a propeller drive.

Figure 2:
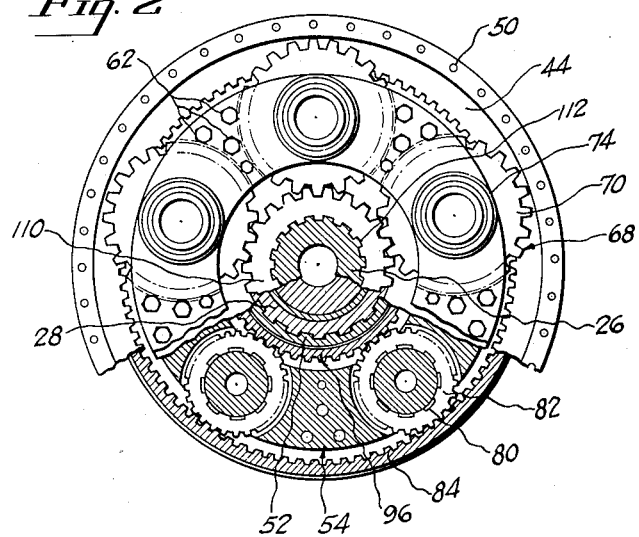

Fig. 2 is a rear elevational view of the improved gear mechanism, certain portions being broken away to better illustrate the construction thereof.

Referring to the drawing in detail, the numeral 10 generally indicates a fragmentary portion of the crankcase of a suitable airplane engine which may be a radial air cooled engine of the type frequently employed for the propulsion of aircraft. The engine, however, is in no way limited to any particular type of engine as the improved gear mechanism is entirely separate from the engine and may be utilized to drive a pair of oppositely rotating coaxial propellers from any suitable power plant. The numeral 12 indicates a detachable nose section forming a portion of the engine and removably secured to the crankcase 10. The engine is provided with a suitable crankshaft 14 having a rotatable mounting in a front bearing 16. Immediately ahead of the front bearing 16 is a web or partition member 18 carrying an antifriction bearing 20, the purpose of which will be presently described, and the crankshaft 14 terminates a short distance ahead of this bearing 20.

The propellers 22 and 24 are mounted side by side in coaxial relation upon one side of the engine, and each propeller is carried upon and driven by a separate shaft, the shaft of the propeller 22 being indicated at 26 and the shaft of the propeller 24 being indicated at 28. The two shafts 26 and 28 are tubular and coextensive over a portion of their lengths so that one is rotatably received within the other. The propellers 22 and 24 have been illustrated as of the controllable pitch type well-known to the art, the hydraulic cylinder and piston mechanism 30 for controlling the propeller pitch being illustrated as located between the two propellers and connected to the propeller blades by suitable connecting members as indicated at 32.

The inner propeller shaft 26 which carries the propeller 22 extends into the hollow forward end of the drive shaft 14 and is there provided with a suitable spigot bearing 34. The outer shaft is centered with respect to the inner shaft by suitable bearings as indicated at 36 and both shafts are centered in the nose section 12 by means of a suitable anti-friction bearing 38 which also takes the load of the propeller thrust and restrains the propeller shafts against axial movement with respect to the engine. The inner shaft 26 is restrained against axial movement with respect to the outer shaft 28 under the influence of propeller thrust by a suitable axial thrust bearing 40.

The drive shaft 14 is provided adjacent its forward end with a series of external splines 42 and upon this splined portion of the drive shaft there is mounted the skirt portion of a bellhousing flange 44, the flange 44 being retained upon the drive shaft by suitable means such as the nut and washer 46. The outer surface of the skirt portion of the bellhousing flange is received by the anti-friction bearing 20 so that this member is definitely centered with respect to the front portion of the engine and is at the same time restrained against axial movement. An annular drive gear 48 is secured to the bellhousing flange 44 by suitable means such as the annular flanges and bolts indicated at 50. The splines 42, bellhousing flange 44, and annular gear 48 comprise the primary driving element of the improved gear arrangement.

The outer propeller shaft or driven shaft 28 is provided adjacent its rear end with a series of longitudinal splines 52 and upon these splines there is mounted a cage member generally indicated at 54. The cage member 54 is made up of three separate parts, 56, 58, and 60, rigidly secured together by means such as the through bolts 62. The intermediate portion 56 is provided with a cylindrical skirt portion 64 provided with internal splines which engage with the splines 52 on the driven shaft to provide a driving connection between the cage 54 and the driven shaft 28. This intermediate portion is also provided with a plurality of spaced bearings, one of which is indicated at 66.

Each of the planetary gears 68 is a compound gear having a reverse drive gear 70 integrally formed upon an elongated tubular shaft 72 provided with three spaced apart annular bearing surfaces 74, 76, and 78, the reverse driving gear 70 being formed between the intermediate bearing surface 76 and one end bearing surface 74 and the portion of the shaft between the intermediate bearing surface 76, and the other end bearing surface 78 being provided with external longitudinal splines 80. Upon the splined portion 80 of each shaft, there is mounted a planetary gear element 82 provided with internal splines which engage with the splines 80 to provide a driving connection between the gear element and the axle upon which it is mounted, and with external gear teeth 84 which mesh with internal gear teeth 86 provided in the annular drive gear 48. The reverse drive gears 70 have a diameter greater than the diameter of the planetary gear elements 82 and are disposed between these planetary gear elements and the bellhousing flange 44 so that the annular gear 48 is provided with an enlarged annular portion 88 which extends over the reverse drive gears to the portion of the annular drive gear 48 provided with gear teeth meshing with the gear teeth of the planetary gear elements 82. An inner center gear or sun gear, generally indicated at 90, is fixed within the nose section 12 by suitable means such as the bolts 92 which extend through the forward portion of the nose section and engage in an annular flange 94 provided in the center gear. This center gear is also provided with a cylindrical skirt portion 96 connected to the annular flange portion by a suitable fillet portion 98 and provided with external gear teeth 100 which mesh with the teeth 84 of the planetary gear elements 82. The cylindrical portion 64 of the intermediate part of the cage member 88 extends through the cylindrical portion 96 of the fixed center gear 90 and has a bearing therein so that the cage is centered with respect to the engine by means of the fixed center gear.

A portion of the cage within the center gear is provided with suitable oil seal rings 102 and an oil passage 104 leads through the center gear from a control element such as the governor 106 to the space between these oil seal rings from where an oil passage 108 conducts the oil to the interior of the outer shaft 28. The oil may then flow through the space between the shafts 26 and 28 to the propeller pitch controlling mechanism 30, or if controllable pitch propellers are not used, the oil may be used to lubricate the bearings 36 between the two shafts.

The sun gear being fixed and meshing with the gear elements 82, will cause these elements to rotate upon rotation of the annular drive gear 48 and to revolve about the center gear, thus when the drive shaft 14 drives the annular drive gear 48, the cage 54 will rotate at a reduced speed with respect to the speed of the drive shaft 14 and will carry the outer driven shaft 28 with it, thus driving the propeller 24 in the same direction as the direction of rotation of the drive shaft. At the same time the rotation of the planetary gear elements 82 will cause the reverse drive gears 70 to rotate as they are being revolved about the axis of the cage 54. The inner driven shaft 26 which carries the propeller 22 is provided with an external gear 110 drivingly connected thereto by suitable means such as the co-operating splines 112 and provided with gear teeth which mesh with the teeth of the reverse drive gears 70. As the reverse drive gears 70 have a diameter greater than the diameter of the planetary gear elements 82, their peripheral speed will be greater than the peripheral speed of the planetary gear elements, by such an amount that as they are rotated by the progress of the planetary gear elements about the fixed center gear, their effect will be to drive the gear 110 and with it the shaft 26 backwardly at a speed equal to the speed of rotation of the cage 54. Thus upon rotation of the annular drive gear 48 by the drive shaft 14, the two propeller carrying driven shafts 26 and 28 will be rotated in opposite directions at a speed different from the speed of rotation of the drive shaft.

The gear 110 is maintained in operative position upon the shaft 26 by a suitable thrust nut 114 and bears at its forward end against the race element 116 of axial thrust bearing 40, the race element 116 of which is screw threaded upon the end of the outer driven shaft 28 and is provided with an abutment 118 which bears against the rearward end of the intermediate portion 56 of the cage 54 and maintains this portion of the cage in operative position upon the splined portion of the outer driven shaft 28. The abutment 118 is preferably of a resilient material to permit a limited amount of free axial movement between the cage and the outer driven shaft.

From the above description, it will be observed that all three of the shafts are operatively connected to their associated elements of the gear train by means of axially slidable splined connections, such connections being provided both to facilitate the assembly of the gear mechanism and also to relieve the mechanism from any strain which might be imposed upon it by load strains carried by the various shafts. As the gear connection between the fixed center gear and planetary gear elements is also slidable in an axial direction, the cage and the compound planetary gears carried thereby constitute a unitary device which is radially centered with respect to the fixed front portion of the engine and drive and driven shafts so that the mesh of the various gears can not change, but which has a limited freedom of movement as a unit in an axial direction so that it will be relieved of all load strains carried by the drive and driven shafts.

With this arrangement of the gear elements the primary driving gear which transmits the power from the engine to the gear unit is made large with a large number of gear teeth and consequent low tooth load between the annular drive gear and the small planetary gears. The load between the planetary gears and the sun gear is only twice that between the annular drive gear and the planetary gears while the load between the reverse driving gears and the gear on the inner propeller shaft is the same as the load between the planetary gears and the sun gear. Thus the tooth load for the primary drive is maintained at the lowest value consistent with the size of the gear unit and the power transmitted and no other tooth loading exceeds twice this value.

In assembling the device the axles of the compound gears 68 are first mounted in the intermediate portion 56 of the cage 54 and the bearings accurately fitted, then the cage portion 58 is applied and the bearings 74 fitted. The planetary gear elements 82 are then mounted upon the splines 80 after which the cage portion 60 is mounted, the bearings 78 fitted, and the through bolts 62 applied to maintain the cage and the gear elements carried thereby in assembled relation. The outer driven shaft 28 may then be inserted in the cage and the bearing race 116 applied. Next, the anti-friction elements of the thrust bearing 40 may be positioned and the gear 110 assembled to mesh with the gears 70 and bear against the thrust bearing 40. The inner driven shaft 26 may then be inserted through the outer driven shaft 28 and the nut 114 applied to hold these various elements together. Next, the annular drive gear 48 is applied over the entire cage assembly and is secured to the bellhousing flange 48 by means of the bolts 50, the bellhousing flange having previously been secured upon the forward end of the drive shaft 14 by the nut 46. Next the nose piece 12 with the center gear 90 and anti-friction bearing 38 mounted therein by means of the bolts 92 is inserted over the outer shaft 28 and into its operative position and secured to the engine crankcase 10 so that the thrust nut 120 may be applied to bring the end of the cylindrical skirt portion 64 of the intermediate portion of the cage against the inner surface of the inner race of the bearing 38. After the nose piece is secured in position by inserting the cap screws or bolts 122, the propellers 24 and 22 may be mounted upon their respective shafts in the usual manner.

While there has been illustrated and described a particular mechanical embodiment relating to the idea of the invention, it is to be understood that the invention is not limited to the particular mechanical embodiment so illustrated and described, but that such changes in the size, shape, and arrangement of parts may be resorted to as come within the scope of the appended claims.

Having now described the invention so that others skilled in the art may clearly understand the same, what it is desired to secure by Letters Patent is as follows:

What is claimed is:

1. In a propeller drive for oppositely rotating coaxial propellers, an engine drive shaft, a pair of propeller carrying driven shafts coaxial with each other and with said driven shaft, and means for driving said driven shafts in opposite directions with respect to each other and at a speed different from the speed of said drive shaft, said means comprising, a planetary gear train including a movable cage on one of said driven shafts, a plurality of planetary gears carried by said cage, a fixed center gear meshing with said planetary gears, an annular drive gear meshing with said planetary gears, a gear on the other of said driven shafts, a reverse driving gear operatively associated with each of said planetary gears meshing with the gear on said other driven shaft, an annular bearing between said fixed center gear and said cage, and a slidable connection between each of said shafts and the associated element of said gear train.

2. In a propeller drive for oppositely rotating coaxial propellers, an engine drive shaft, an inner and an outer propeller carrying driven shaft, said driven shafts being coaxial with each other and with said drive shaft, and means for driving said driven shafts in opposite directions with respect to each other and at a speed different from the speed of said drive shaft, said means comprising, a cage on said outer driven shaft, a planetary gear train having a fixed center gear for driving said cage from said drive shaft, a gear on said inner driven shaft, and gears associated with said planetary gears and meshing with said gear on the inner driven shaft for driving said inner driven shaft in a direction opposite to the direction of rotation of said cage and outer driven shaft, a slidable connection between each of said shafts and the associated element of said gear train, a propeller thrust load and centering bearing between said outer shaft and a fixed portion of the engine, and a radial thrust bearing between said inner and outer driven shafts.

3. In a propeller drive for oppositely rotating coaxial propellers, an engine drive shaft, a pair of propeller carrying driven shafts coaxial with each other and with said driven shaft, and means for driving said driven shafts in opposite directions with respect to each other and at a speed different from the speed of said drive shaft, said means comprising, a planetary gear train including a rotatable cage drivingly connected to one of said driven shafts, a plurality of planetary gears and respective reverse driving gears integrally formed on the same axle carried by said cage, a fixed center gear meshing with said planetary gears, an annular drive gear meshing with said planetary gears and operatively connected with said drive shaft, and a gear on the other of said driven shafts meshing with said reverse drive gears, and an oil lead extending through a portion of said fixed center gear and to the interior of one of said coaxial driven shafts.

4. In a propeller drive for oppositely rotating coaxial propellers, an engine drive shaft, a pair of propeller carrying driven shafts coaxial with each other and with said driven shaft, and means for driving said driven shaft in opposite directions with respect to each other and at a speed different from the speed of said drive shaft, said means comprising, a planetary gear train including a rotatable three part cage having the intermediate part drivingly connected to one of said driven shafts and the other parts rigidly secured thereto, a plurality of planetary gears and respective reverse drive gears integrally formed on the same axle carried by said cage, each axle having three spaced bearings in said cage, a fixed center gear meshing with said planetary gears, an annular drive gear meshing with said planetary gears and operatively connected with said drive shaft, and a gear on the other of said driven shafts meshing with said reverse drive gears.

5. In a propeller drive for oppositely rotating coaxial propellers, an engine drive shaft, a pair of propeller carrying driven shafts coaxial with each other and with said driven shaft, and means for driving said driven shafts in opposite directions with respect to each other and at a speed different from the speed of said drive shaft, said means comprising, a planetary gear train including a movable cage on one of said driven shafts, a plurality of planetary gears, an annular drive gear meshing with said planetary gears, a gear on the other of said driven shafts, a reverse driving gear operatively associated with each of said planetary gears meshing with the gear on said other driven shaft, and an annular bearing between said fixed center gear and said cage, and an oil lead for lubricating or propeller operating fluid extending through said fixed center gear and said cage to the interior of one of said driven shafts.

EARLE A. RYDER.